United States Patent
Croak et al.

(10) Patent No.: US 8,675,638 B2
(45) Date of Patent: *Mar. 18, 2014

(54) METHOD AND APPARATUS FOR ENABLING DUAL TONE MULTI-FREQUENCY SIGNAL PROCESSING IN THE CORE VOICE OVER INTERNET PROTOCOL NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 392 days.

This patent is subject to a terminal disclaimer.

(21) Appl. No.: 13/084,311

(22) Filed: Apr. 11, 2011

(65) Prior Publication Data

US 2011/0188495 A1    Aug. 4, 2011

Related U.S. Application Data

(63) Continuation of application No. 11/003,746, filed on Dec. 3, 2004, now Pat. No. 7,924,814.

(51) Int. Cl.
*H04L 12/66* (2006.01)
*H04M 1/64* (2006.01)
*G06Q 30/00* (2012.01)

(52) U.S. Cl.
USPC .......... 370/352; 340/5.61; 340/531; 370/252; 370/401; 379/15.03; 379/27.01; 379/88.02; 379/93.27; 379/221.08; 455/74.1; 704/235; 705/5; 705/26.1; 707/741

(58) Field of Classification Search
USPC .......... 340/531, 5.61; 370/352, 401, 252; 379/15.03, 27.01, 88.02, 88.13, 88.14, 379/93.25, 100.11, 196, 218.01, 221.08, 379/88.16, 88.18, 93.27, 265.09, 406.01; 705/5, 26.1; 707/741; 455/74.1; 704/235

See application file for complete search history.

(56) References Cited

U.S. PATENT DOCUMENTS

| | | | | |
|---|---|---|---|---|
| 4,974,254 A | * | 11/1990 | Perine et al. | 379/100.11 |
| 5,416,831 A | * | 5/1995 | Chewning et al. | 379/93.25 |
| 5,706,328 A | * | 1/1998 | Williman | 379/15.03 |
| 5,761,280 A | * | 6/1998 | Noonen et al. | 379/93.27 |
| 5,982,767 A | | 11/1999 | McIntosh | |
| 6,035,020 A | | 3/2000 | Weinstein et al. | |
| 6,069,891 A | | 5/2000 | Mandalia et al. | |
| 6,075,783 A | | 6/2000 | Voit | |
| 6,078,581 A | | 6/2000 | Shtivelman et al. | |
| 6,125,113 A | | 9/2000 | Farris et al. | |
| 6,141,341 A | | 10/2000 | Jones et al. | |
| 6,144,670 A | | 11/2000 | Sponaugle et al. | |
| 6,259,691 B1 | | 7/2001 | Naudus | |
| 6,298,056 B1 | | 10/2001 | Pendse | |
| 6,304,637 B1 | | 10/2001 | Mirashrafi et al. | |
| 6,487,209 B1 | * | 11/2002 | Valentine et al. | 370/401 |
| 6,731,724 B2 | * | 5/2004 | Wesemann et al. | 379/88.16 |
| 6,839,422 B2 | * | 1/2005 | Williams et al. | 379/221.08 |
| 6,845,356 B1 | * | 1/2005 | Epstein | 704/235 |
| 6,920,313 B2 | * | 7/2005 | Trombatore | 455/74.1 |
| 7,002,912 B2 | | 2/2006 | Wengrovitz | |
| 7,061,901 B1 | | 6/2006 | Shnitzer et al. | |

(Continued)

*Primary Examiner* — Gerald Gauthier

(57) ABSTRACT

The invention provides a method and apparatus for enabling DTMF signal processing in the core VoIP network. More specifically, the present invention enables a VoIP network to recognize and respond to special DTMF signals entered by a user and initiate the appropriate service logic response to satisfy the user's service request.

20 Claims, 4 Drawing Sheets

(56) References Cited

U.S. PATENT DOCUMENTS

| | | |
|---|---|---|
| 7,075,921 B2 | 7/2006 | Siegrist et al. |
| 7,092,515 B2 * | 8/2006 | Gierachf .................. 379/406.01 |
| 7,123,697 B2 | 10/2006 | Amir et al. |
| 7,248,157 B2 * | 7/2007 | Bergman et al. ............. 340/531 |
| 7,257,201 B2 * | 8/2007 | Singh et al. ................ 379/88.13 |
| 7,305,681 B2 | 12/2007 | Khartabil |
| 7,379,881 B2 | 5/2008 | Smithies et al. |
| 7,512,114 B2 | 3/2009 | Laturell |
| 7,924,814 B1 * | 4/2011 | Croak et al. ................. 370/352 |
| 8,068,585 B2 * | 11/2011 | Stillman et al. ............ 379/27.01 |
| 2001/0012350 A1 * | 8/2001 | Ehlinger ...................... 379/196 |
| 2002/0057783 A1 * | 5/2002 | Kredo et al. .............. 379/218.01 |
| 2002/0122541 A1 * | 9/2002 | Metcalf ...................... 379/88.02 |
| 2002/0176404 A1 | 11/2002 | Girard |
| 2003/0002478 A1 * | 1/2003 | El-Gebaly et al. ............ 370/352 |
| 2003/0006879 A1 * | 1/2003 | Kang et al. ................... 340/5.61 |
| 2003/0050039 A1 | 3/2003 | Baba et al. |
| 2003/0165231 A1 * | 9/2003 | Singh et al. .............. 379/265.09 |
| 2003/0174693 A1 | 9/2003 | Gallant et al. |
| 2003/0235282 A1 | 12/2003 | Sichelman et al. |
| 2004/0037401 A1 * | 2/2004 | Dow et al. .................. 379/88.18 |
| 2004/0161095 A1 | 8/2004 | Kredo et al. |
| 2005/0089150 A1 * | 4/2005 | Birkhead et al. ........... 379/88.14 |
| 2005/0152347 A1 | 7/2005 | Chen et al. |
| 2005/0154621 A1 * | 7/2005 | Birkhead et al. .................. 705/5 |
| 2005/0246235 A1 * | 11/2005 | Wilczynski et al. ............ 705/26 |
| 2008/0022000 A1 | 1/2008 | Furuya et al. |
| 2008/0212486 A1 * | 9/2008 | Stillman et al. ............... 370/252 |
| 2011/0188495 A1 * | 8/2011 | Croak et al. ................. 370/352 |
| 2012/0173537 A1 * | 7/2012 | Shaffer et al. ................. 707/741 |

* cited by examiner

METHOD AND APPARATUS FOR ENABLING DUAL TONE MULTI-FREQUENCY SIGNAL PROCESSING IN THE CORE VOICE OVER INTERNET PROTOCOL NETWORK

This application is a continuation of U.S. patent application Ser. No. 11/003,746, filed Dec. 3, 2004, now U.S. Pat. No. 7,924,814 B1, which is herein incorporated by reference in its entirety.

The present invention relates generally to communication networks and, more particularly, to a method and apparatus for enabling Dual Tone Multi-Frequency (DTMF) signal processing in the core Voice over Internet Protocol (VoIP) network.

BACKGROUND OF THE INVENTION

Users of VoIP network services will sometimes need to enter touchtone (DTMF) signals while a call is in progress to initiate an event with the network operator. For instance, a user engaged in a conference call conversation may want to bridge another user onto the call and will enter touchtone signals, typically a specific sequence of touchtone such as "**9", to let the network service operator know to set up and bridge another conference call leg onto the call in progress. Since DTMF signals are embedded and carried the same way as voice transmission in VoIP, certain embedded DTMF signals that can be used to initiate and request network services require special processing by the VoIP network to recognize these special DTMF signals.

Therefore, a need exists for a method and apparatus for enabling DTMF signal processing in the core VoIP network.

SUMMARY OF THE INVENTION

In one embodiment, the present invention enables DTMF signal processing in the core VoIP network. More specifically, the present invention enables a VoIP network to recognize and respond to special DTMF signals entered by a user and initiate the appropriate service logic response to satisfy the user's service request.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
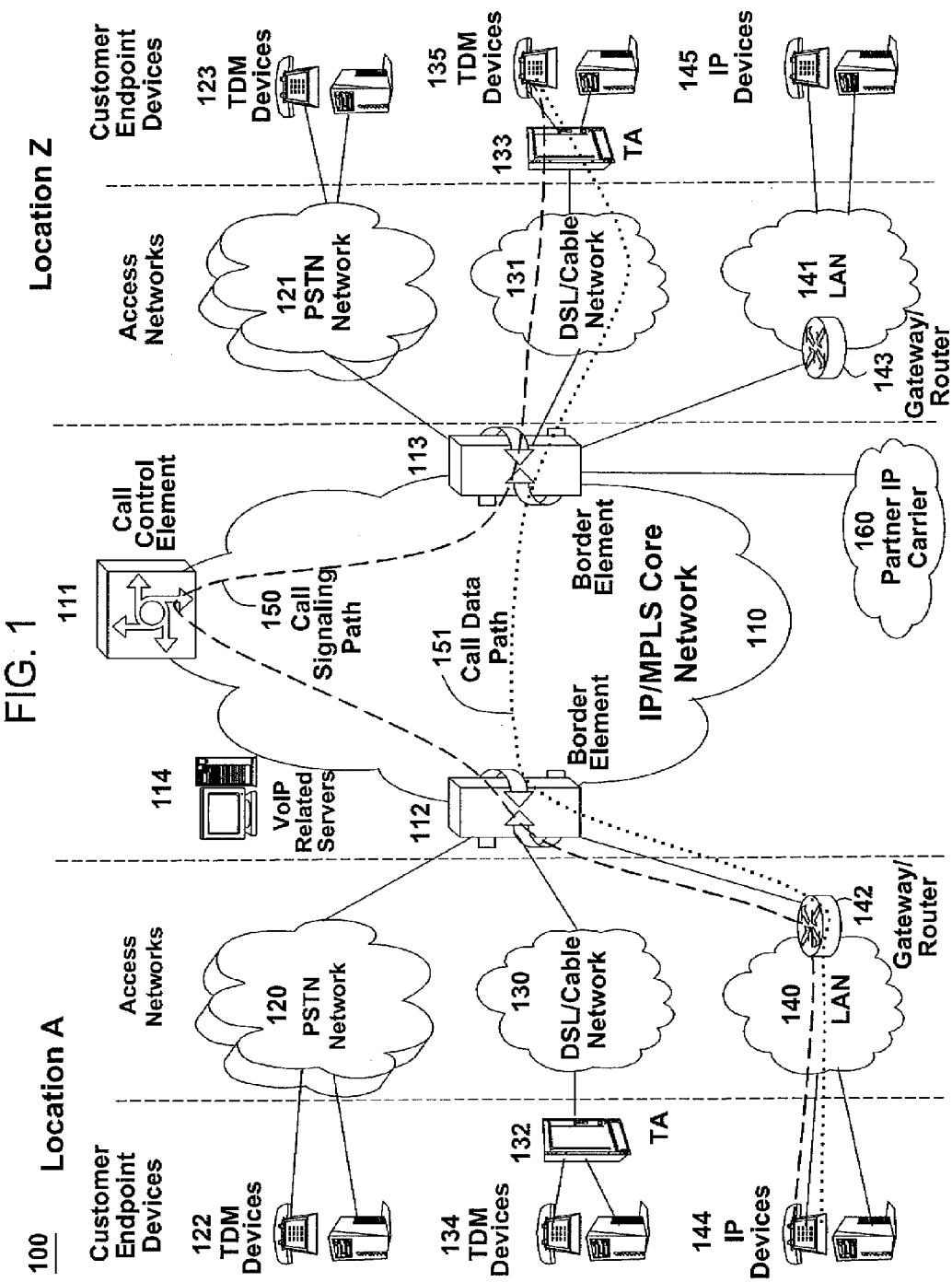
FIG. 1 illustrates a Voice over Internet Protocol (VoIP) network model related to the present invention.

To better understand the present invention, FIG. 1 illustrates an example network, e.g., a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, an call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Users of VoIP network services will sometimes need to enter touchtone (DTMF) signals while a call is in progress to initiate an event with the network operator. For instance, in a bridging service, a user engaged in a conference call conversation may want to bridge another user onto the call and will enter touchtone signals, typically a specific sequence of touchtone such as "**9", to let the network service operator know to configure and bridge another conference call leg onto the call in progress. Since DTMF signals are embedded and carried the same way as voice transmission (e.g., within a voice media transmission stream) in VoIP, certain embedded DTMF signals that can be used to initiate and request network services require special processing by the VoIP network to recognize these special DTMF signals. To address this criticality, the present invention provides a method and apparatus for enabling DTMF signal processing in the core VoIP network.

It should be noted that various network services can be requested using the present invention. For example, the network services that can be requested include but is not limited to Interactive Voice Response (IVR) based applications, IP Toll Free services, and IP Transfer Connect services. IVR application is a telephony technology in which someone uses a touch-tone telephone to interact with a database to acquire information from or enter data into the database. IP Toll Free service is a service similar to the traditional toll free service except that toll free calls, such as 800 number calls, are carried over a VoIP network and terminated at an IP endpoint. IP Transfer Connect service is a service which enables IP Toll Free subscribers to transfer or redirect a calling party to another designated location based on touch tone selections made by the calling party.

Figure 2:
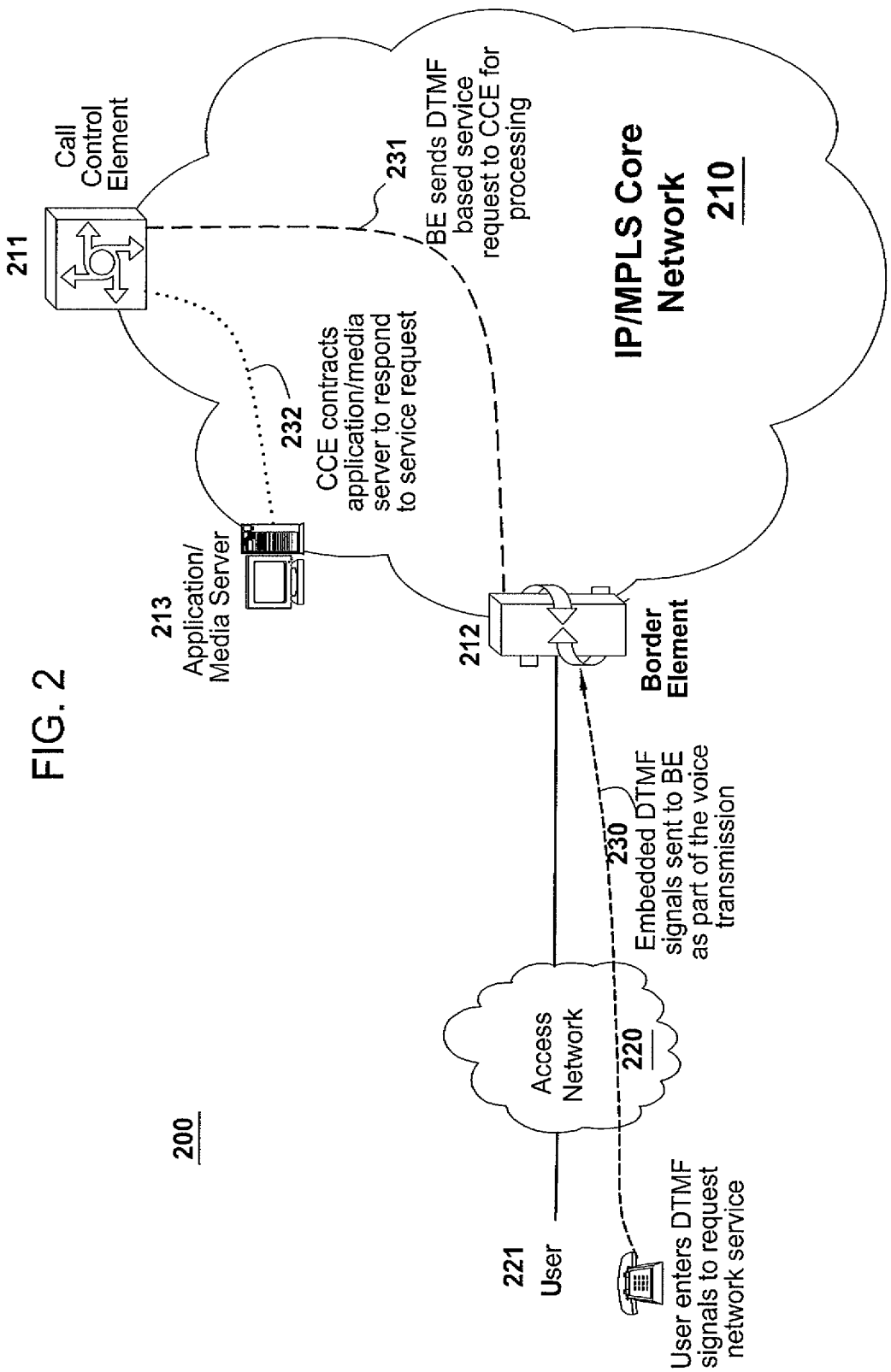
FIG. 2 illustrates an example of a sequence of events related to special DTMF signal processing by the core VoIP network of the present invention.

FIG. 2 illustrates an example of a sequence of events related to special DTMF signal processing by the core VoIP network of the present invention. User 221, who is already a party of a conference call in progress, enters special DTMF key sequence to request network service from the network operator. The DTMF signals are sent as part of the regular voice transmission to the BE 212. DTMF signals that correlate to network services are predefined so that it can be extracted and recognized by each BE. This flow is shown in path 230.

Upon receiving the DTMF signals, the BE 212 extracts the embedded DTMF signals and performs decoding of the signals. The BE 212 has decoded that the signals are a request for network service; therefore, BE 212 sends the service request to CCE 211 for processing using SIP signaling messages. This flow is shown in path 231. In one embodiment of the present invention, the BE translates the DTMF signals into a corresponding service request command and sends the command embedded within a SIP signaling message to the CCE for processing.

Upon receiving the service request, the CCE 211 invokes the appropriate application/media service 213 to respond with the appropriate service logic to serve the service request originated by user 221 using DTMF signals. This flow is shown in path 232.

Figure 3:
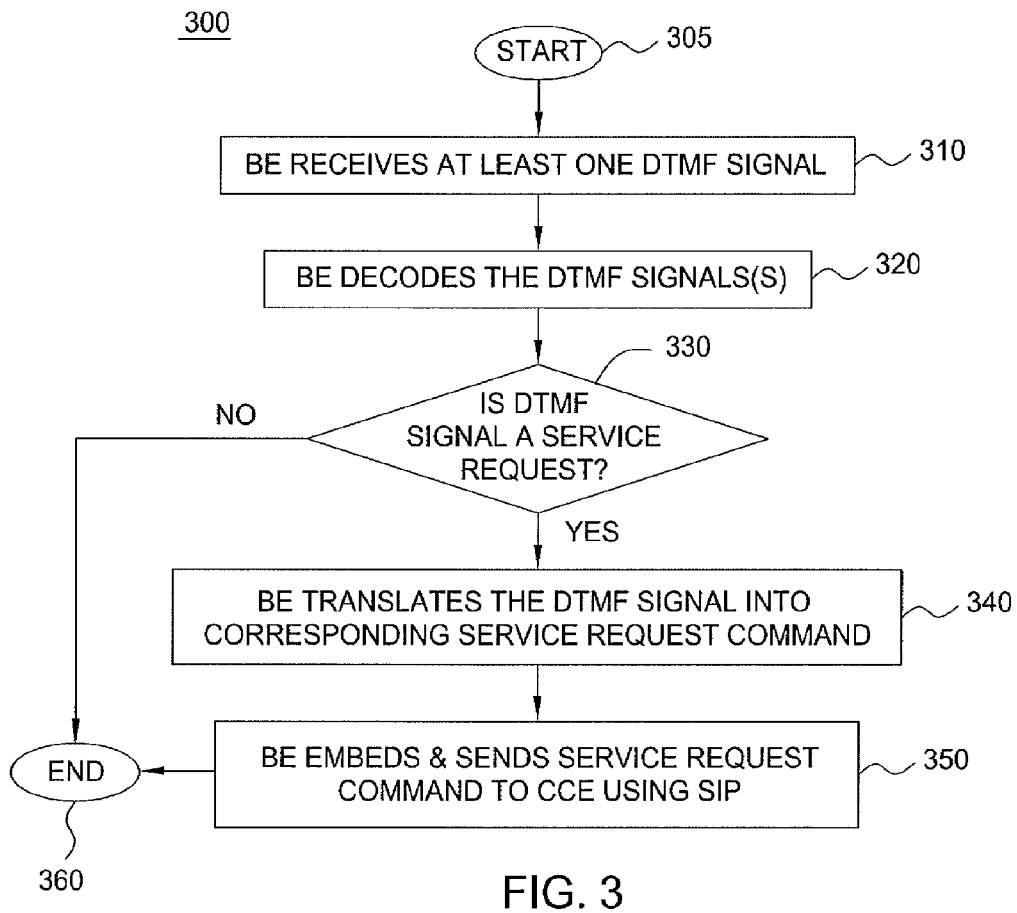
FIG. 3 illustrates a flowchart of a method of enabling DTMF signals handling by the core VoIP network of the present invention.

FIG. 3 illustrates a flowchart of a method 300 of enabling DTMF signals handling by a BE in the core VoIP network. Method 300 starts in step 305 and proceeds to step 310.

In step 310, the method receives at least one DTMF signal in the voice transmission stream of a call in progress. In step 320, the method decodes the DTMF signal(s).

In step 330, the method queries whether the decoded DTMF signal(s) correspond to a network service request. If the signal is a service request, the method proceeds to step 340; otherwise, the method ignores the DTMF signal and proceeds to step 360.

In step 340, the method translates the DTMF signal into a corresponding network service request command. In step 350, the method embeds the request command into a SIP signaling message and sends it to the CCE. The method ends in step 360.

Figure 4:
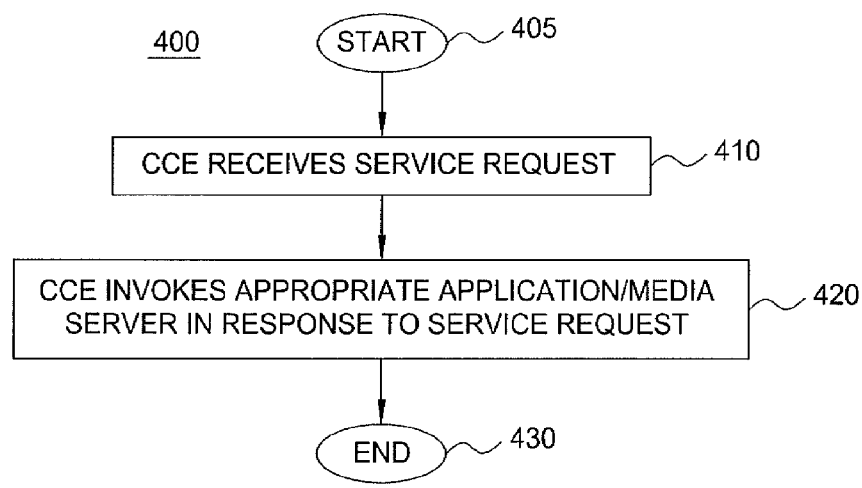
FIG. 4 illustrates a flowchart of a method of handling DTMF service request by the core VoIP network of the present invention.

FIG. 4 illustrates a flowchart of a method 400 of handling DTMF service request by the CCE in the core VoIP network. Method 400 starts in step 405 and proceeds to step 410.

In step 410, the method receives a SIP signaling message with an embedded network service request command. In step 420, the method processes the network service request command and invokes the appropriate application and/or media servers with the corresponding service logic in response to the request. The method ends in step 430.

It should be noted that the present invention is described such that the DTMF processing is distributed, e.g., various functions of processing the DTMF signal is distributed between the BE and CCE. However, the present invention is not so limited. Namely, these various functions can be consolidated into a single module in accordance with requirement of a particular deployment. For example, various functions performed by the CCE can be implemented with each BE, and vise versa.

Figure 5:
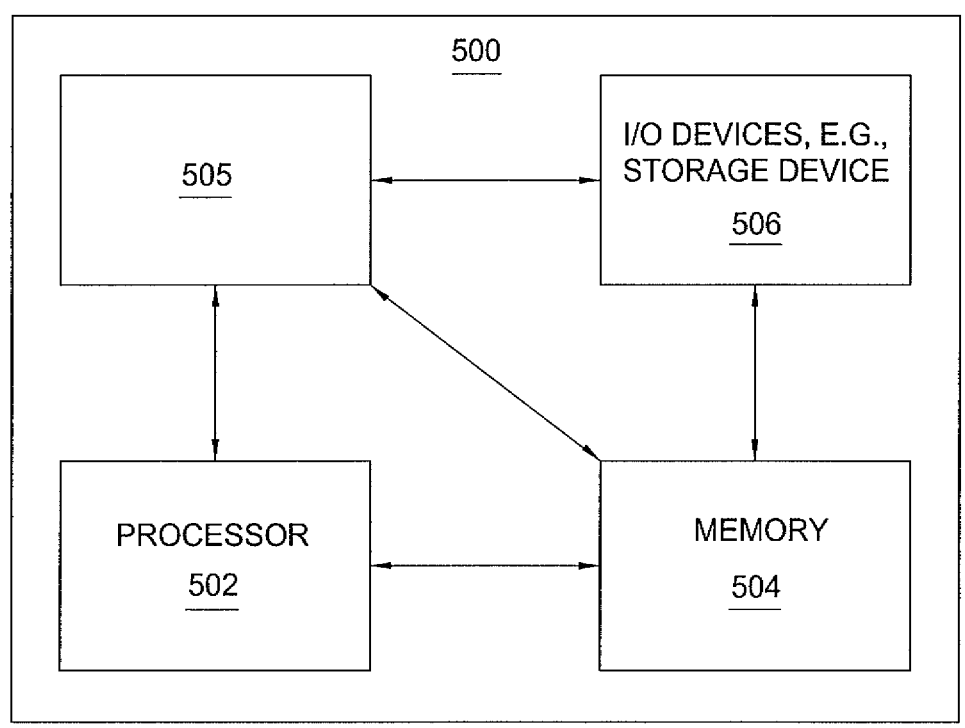
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a DTMF processing module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present DTMF processing module or process 505 can be loaded into memory 504 and executed by processor 502 to implement the functions as discussed above. As such, the present single number to multiple devices process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a dual tone multi frequency signal in an Internet protocol communications network; comprising:
    receiving, by a processor of a network element of the Internet protocol communications network, the dual tone multi frequency signal;
    translating, by the processor, the dual tone multi frequency signal into a service request command;
    embedding, by the processor, the service request command in a signaling message; and
    sending, by the processor, the signaling message with the service request command that is embedded, wherein the signaling message is sent for invoking a server in the internet protocol communications network to service the service request command.

2. The method of claim 1, wherein the network element comprises a border element of the internet protocol communications network.

3. The method of claim 1, wherein the invoking is performed by a call control element.

4. The method of claim 1, wherein the dual tone multi frequency signal is within a voice media transmission stream.

5. The method of claim 4, further comprising:
    extracting the dual tone multi frequency signal from the voice media transmission stream.

6. The method of claim 3, wherein the signaling message is sent to the call control element.

7. The method of claim 1, wherein the service request command comprises a service request command for a bridging service.

8. The method of claim 1, wherein the service request command comprises a service request command for an interactive voice response based application.

9. The method of claim 1, wherein the service request command comprises a service request command for an internet protocol toll free service.

10. The method of claim 1, wherein the service request command comprises a service request command for an internet protocol transfer connect service.

11. A tangible computer-readable medium storing a plurality of instructions which, when executed by a processor of a network element of an internet protocol communications network, cause the processor to perform a operations for processing a dual tone multi frequency signal in the internet protocol communications network, the operations comprising:
    receiving the dual tone multi frequency signal;
    translating the dual tone multi frequency signal into a service request command;
    embedding the service request command in a signaling message; and
    sending the signaling message with the service request command that is embedded, wherein the signaling message is sent for invoking a server in the internet protocol communications network to service the service request command.

12. The tangible computer-readable medium of claim 11, wherein the network element comprises a border element of the internet protocol communications network.

13. The tangible computer-readable medium of claim 11, wherein the invoking is performed by a call control element.

14. The tangible computer-readable medium of claim 11, wherein the dual tone multi frequency signal is within a voice media transmission stream.

15. The tangible computer-readable medium of claim 14, further comprising:
    extracting the dual tone multi frequency signal from the voice media transmission stream.

16. The tangible computer-readable medium of claim 13, wherein the signaling message is sent to the call control element.

17. The tangible computer-readable medium of claim 11, wherein the service request command comprises a service request command for a bridging service.

18. The tangible computer-readable medium of claim 11, wherein the service request command comprises a service request command for an interactive voice response based application.

19. The tangible computer-readable medium of claim 11, wherein the service request command comprises a service request command for an internet protocol toll free service.

20. A system for processing a dual tone multi frequency signal in an internet protocol communications network, comprising:
    a border element of the internet protocol communications network comprising a processor; and
    a computer-readable medium storing a plurality of instructions which, when executed by the processor, cause the processor to perform operations, the operations comprising:
        receiving the dual tone multi frequency signal;
        translating the dual tone multi frequency signal into a service request command;
        embedding the service request command in a signaling message; and
        sending the signaling message with the service request command that is embedded, wherein the signaling message is sent for invoking a server in the internet protocol communications network to service the service request command.

* * * * *